United States Patent [19]

Smorenburg

[11] 4,009,230
[45] Feb. 22, 1977

[54] DEVICE FOR VACUUM TREATMENT OF LIQUIDS BY MEANS OF A GASEOUS STRIP-MEDIUM

[75] Inventor: Johannes Jacobus Smorenburg, Abcoude, Netherlands

[73] Assignee: Stark Amsterdam NV, Netherlands

[22] Filed: Aug. 26, 1974

[21] Appl. No.: 500,495

Related U.S. Application Data

[62] Division of Ser. No. 258,574, June 1, 1972, abandoned.

[30] Foreign Application Priority Data

June 1, 1971  Netherlands ............... 7107525

[52] U.S. Cl. .................. 261/148; 261/149; 202/173; 203/76; 203/90; 203/93
[51] Int. Cl.² ................ B01D 3/10; B01D 3/26
[58] Field of Search ... 261/148, 149, 151, DIG. 76; 159/16 S, 18; 202/173; 203/49, 76, 90, 92, 93

[56] References Cited

UNITED STATES PATENTS

| | | | |
|---|---|---|---|
| 351,795 | 11/1886 | Rice | 159/27 B |
| 351,796 | 11/1886 | Rice | 159/27 B |
| 594,467 | 11/1897 | Dyer | 203/79 |
| 1,385,660 | 7/1921 | Bodman et al. | 203/79 |
| 2,360,714 | 10/1944 | Payne | 261/148 |
| 2,368,669 | 2/1945 | Lee et al. | 203/49 |
| 2,621,196 | 12/1952 | Thurman | 159/18 |
| 2,759,883 | 8/1956 | Thurman | 203/79 |
| 2,894,880 | 7/1959 | Sisson et al. | 203/93 |
| 2,991,298 | 7/1961 | Raffaeta | 203/90 |
| 3,515,200 | 6/1970 | Shah | 159/47 WL |
| 3,587,488 | 6/1971 | Mutke | 159/18 R |
| 3,608,279 | 9/1971 | West | 261/117 |
| 3,649,471 | 3/1972 | Kunst | 159/18 |
| 3,681,897 | 8/1972 | Mitchell et al. | 261/114 R |
| 3,893,893 | 7/1975 | Miserlis et al. | 203/96 |

*Primary Examiner*—Tim R. Miles
*Assistant Examiner*—Gregory N. Clements
*Attorney, Agent, or Firm*—Wilkinson, Mawhinney & Theibault

[57] ABSTRACT

Oil or fat is deodorized by contacting with steam. The oil or fat is finely distributed in a vacuum contact zone by spray means whereupon it contacts a steam vapor. The contacted oil or fat is then recycled in the same contact zone, finely distributed, and once again contacted with the steam vapor. The steam efficiently removes flavoring and scenting components and free fatty acids normally present in natural fats and oils.

2 Claims, 3 Drawing Figures

DEVICE FOR VACUUM TREATMENT OF LIQUIDS BY MEANS OF A GASEOUS STRIP-MEDIUM

DISCUSSION OF THE PRIOR ART

The invention relates to treating liquids with a gaseous stripper in a vacuum zone space, and in particular to a device for deodorizing fats and oils and is a divisional application of my application Ser. No. 258,574, filed June 1, 1972, now abandoned.

It is known that fats and oils are deodorized by causing them to flow continuously in an apparatus in a counter-current to the direction of a stripper medium. The gaseous stripper medium is generally steam.

With prior art methods and devices it is known that the oil or fat flows through sieve bottoms in the device, so that the oil pours down, or bottoms are used over which the oil flows. The thickness of the layer of oil is regulated in such a way that the stripper media, generally steam, flowing in the vicinity of the bottom through distributing members, bubbles through the oil. Such methods and devices have drawbacks in that e.g. the apparatus must be very large in order to achieve the required removal of volatile components. This applies particularly to the process of deodorizing and desacidulating by distillation the fats and oils, in which processes not only the unwanted flavouring and scenting components are removed and carried away by the gaseous stripper medium but moreover the free fatty acids are removed from the fats and oils. Another drawback of these unknown methods and devices consists in that the time during which the fats or oils remain in the apparatus cannot be controlled so that not only that particular parts of the oils and fats are repeatedly exposed to the treatment by steam, but other parts of the oils and fats receive little treatment and are incorporated in an almost unchanged condition into the final product. Although the percentage of unwanted substances are considerably reduced they can give rise to very undesired properties of in the product when stored for a prolonged period.

SUMMARY OF THE INVENTION:

It is an object of the invention to provide a device which eliminates the aforementioned problems, so that a smaller apparatus maybe employed while efficiently removing unwanted flavoring and scenting components and free fatty acids normally present in such oils and fats.

The foregoing object is attained according to the invention for treating liquids with a gaseous stripper medium in a vacuum zone, particularly for deodorizing fats and distilling fatty acids. The liquid, in a finely distributed condition, in at least in one area is brought into contact with a stripper medium, this liquid is then recycled in this area and in a finely distributed condition is again brought into contact with the stripper medium.

When liquids are recycled in an area and again finely distributed the fatty acids, scenting and flavoring substances are efficiently removed.

In a very efficient way the liquid fed to an area is at least once and preferably several times recycled. Recycling at least once assures that the liquid comes into contact with the stripper medium at least once.

On the other hand it is advisable to regulate the time during which the liquid remains between the inlet for the liquid supplied to the area and the outlet for the liquid discharged from that area, and to regulate the period during which the liquid remains in said area to a minimum.

The invention relates also to a device for treating liquids with a gaseous stripper medium in a vacuum zone, particularly for deodorizing oils and fats, comprising one column with one or more vacuum zones with a connecting pipe to a vacuum source. A supply pipe for the stripper medium, opens into the vacuum zone in its vicinity of the bottom. A supply pipe for distributing the liquid in the upper part of the vacuum zone and a discharge pipe for the liquid, is provided with a liquid recycling line opening in the vicinity of or in the bottom of said zone. A liquid circulating device is incorporated into, the recylcling line which opens into a liquid distributing member in the upper part of the vacuum section.

It is advisable to provide the device with a guide member allowing delivery of the liquid, which is supplied by the recycling line and distributed by the distributing member, on the bottom of the vacuum section and at some distance from the outlet for said liquid.

The inlet for the liquid, the outlet for the liquid and the recycling line are provided in the lower part of the vacuum section and the capacity of the pump is such, that the supplied liquid can be recirculated at least once through the recycling line.

SURVEY OF THE DRAWINGS

FIG. 1 represents in outline a continuously operating device according to the invention;

FIG. 2 resprements a semi continuously operating device with a siphon system for the discharge of oil, and FIG. 3 is a plan view of the same vacuum section as represented in FIG. 2.

DESCRIPTION OF PREFERRED EMBODIMENTS

Figure 1:
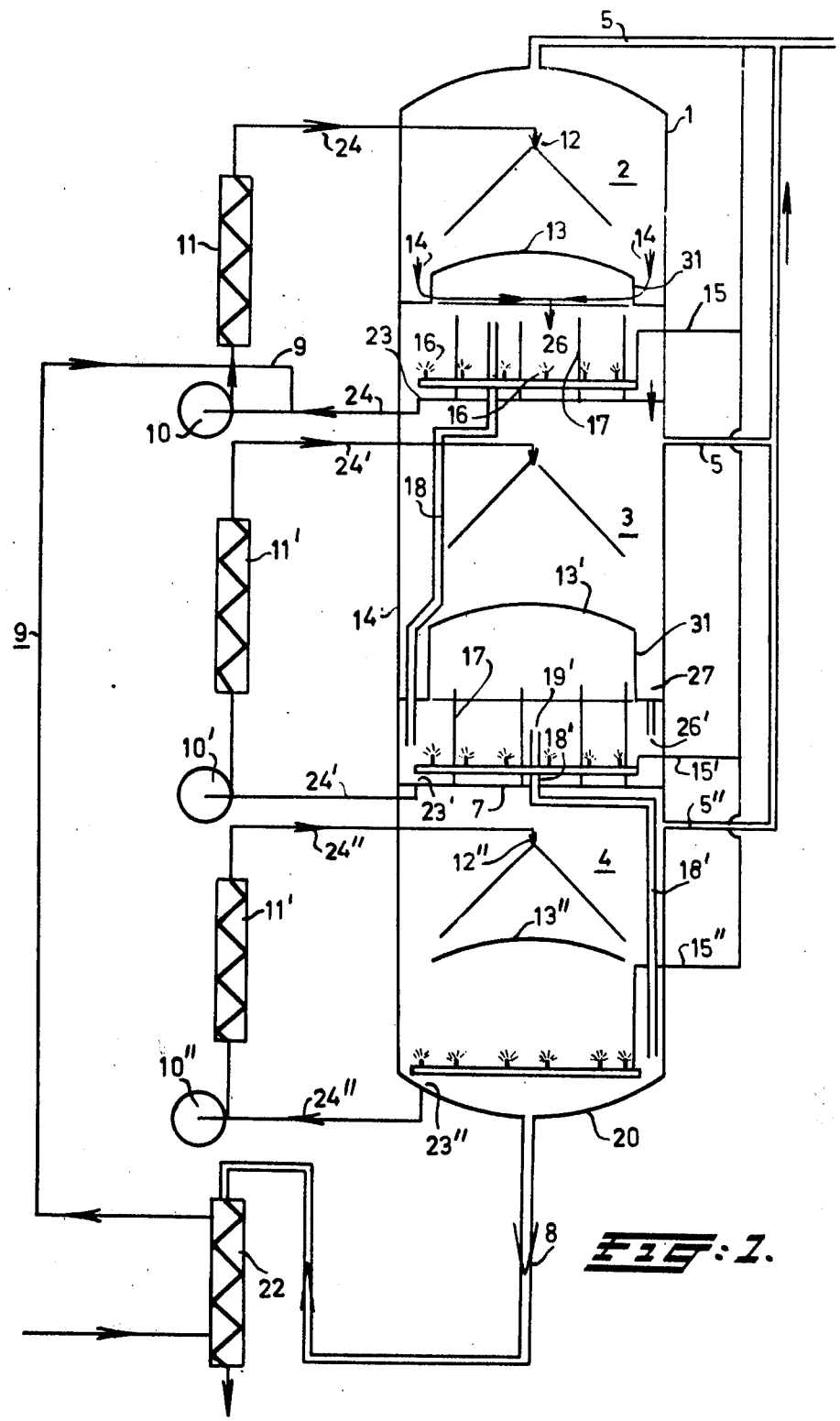

In FIG. 1 illustrates a device for deodorizing oils and fats. The device is not limited to this purpose but that it can also be utilized for removing unwanted substances from other liquids. Although steam as a gaseous stripper medium is described other gases can also be used particularly an inert gases like nitrogen.

The device represented in FIG. 1 consists of a deodorizing column 1 comprising three vacuum sections 2, 3, 4 respectively for treating oil with a gaseous stripper medium. In the vacuum sections there is produced a high vacuum of the order of 2 to 4 mm column of mercury absolute. Each section is provided with line 5, 5: and 5:: connected to a source of vacuum.

The sections 2, 3 and 4 are separated by bottoms 6 and 7. The vacuum section 4 is provided on its underside with a discharge pipe 8 for the liquid, while the device is provided with a supply pipe 9 for the liquid. This supply pipe 9 communicates with a pump 10, which via the heat exchanger 11 supplies the liquid to the vacuum section 2. The spray nozzle 12 sprays the liquid oil in the vacuum section.

Spaced above the bottom 6 of the vacuum section is a covering hood 13 which except for an annular opening 14 closes the cross sectional area of the vacuum section for the greater part.

In the vicinity of the bottom 6 of the vacuum section 2 opens to the supply pipe 15 for the steam via the outlet openings 11 into the section 2.

Vertical guide partitions 17 are arranged on the bottom.

Under the covering hood 13 is a standpipe 18 through which by an inlet 19 the liquid of the latter can be supplied to another vacuum section 3. This vacuum section 3 is also provided with a discharge line 5' for the steam.

The pump 10 in addition to the liquid fed to the spray nozzle 12 via the supply pipe 9, via the recycling pipe 24 also sucks a part of the liquid which is on the bottom 6 of the vacuum section 2 and recycles same together with the supplied liquid, via the spray nozzle 11, into the vacuum section 2.

The liquid oil transmitted via the standpipe 18 and opening 19 to the next vacuum section is supplied, through the recycling pipe 24, the pump 10' and the heat exchanger 11', to a spray nozzle 12' while the liquid distributed by the spray nozzle falls upon a covering hood 13', whereby the liquid falls again on the marginal part of the bottom 7.

In the vacuum section 3 a standpipe 18' is positioned with an inlet 19' by which the liquid can flow into the next vacuum section 4.

The liquid oil is recycled from the bottom of the vacuum section 4 to the spray nozzle 12'' by means of the recycling line 24'', the pump 10'' and the heat exchanger 11'', this oil again falling on the covering hood 13'' from where the liquid is again supplied to the marginal part of the bottom 20.

From the bottom 20 the deodorized oil flows via the pipe 8 and pump 21 to the second heat exchanger 22 and from there it is discharged.

The supply current passes in counter flow through the heat exchanger 22 and falls thereupon via the pipe 9 in the pump 10.

Since the capacity of the pump is many times greater than the quantity of liquid supplied in a unit of time, in the present case five times greater, the quantity of oil in a vacuum sections 2, 3 or 4 are repeatedly in a finely distributed condition introduced into the vacuum section where it comes into contact with the gaseous stripper medium, in this case is steam.

The steam discharged via the vacuum lines 5, 5' and 5'' passes a condenser where the steam is condensed and thereupon the components carried along, if any, are separated from the aqueous liquid.

Due to the application of the spray nozzles 12, 12' and 12'' the surface of the oil introduced into the sections is large so that the deodorizing process proceeds fast.

Due to the application of the concentric partitions 17 the liquid on the bottoms 6, 7 or 20 is caused to remain there for a particular time.

As a consequence of the fact that the liquid is recirculated with such a capacity and recycled by means of a collecting device there is a positive flow of recycled liquid produced toward the inlet 23 of the recycling line 24. In this way it is assured that all liquid passes the spray nozzles 12, 12' and 12'' at least once.

Another considerable advantage is in the variable capacity of this device. By stepping up the capacity of the pumps 10, 10', 10'' it is possible to increase the quantity of recycled liquid considerably whereby the capacity of the device is increased. It is moreover possible to regulate the capacity of the device by means of the pumps 10, 10' and 10''.

Figure 2:
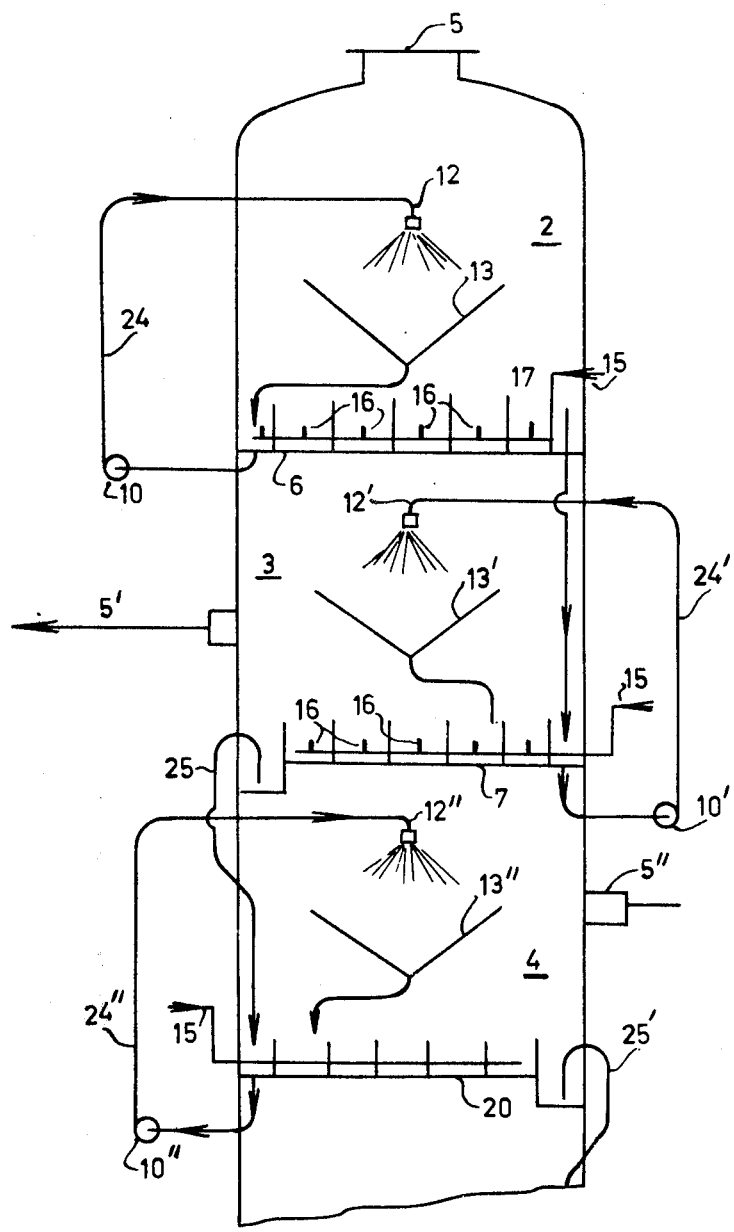
Figure 5:
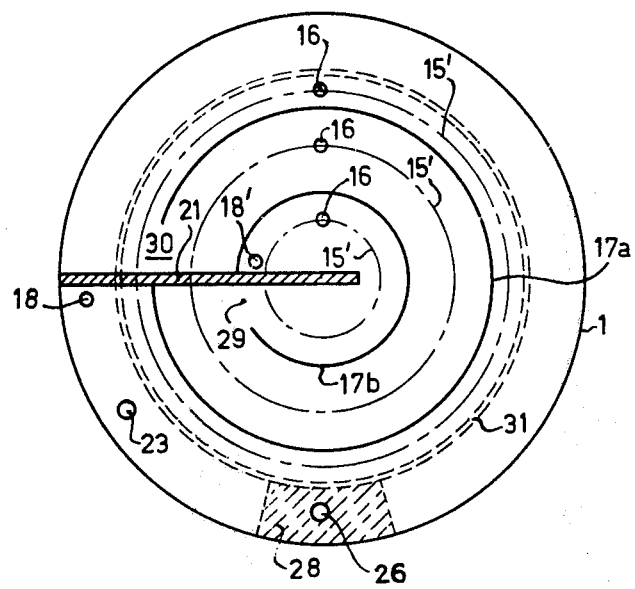

FIG. 2 diagrammatically represents a modified embodiment of the device according to the invention which contrary to the device shown in FIG. 1 operates discontinuously.

In this figure similar reference numerals designates the similar parts of FIG. 1.

In this case, however, the discharge of the liquid from the bottoms 6 and 7 is effected by means of a siphon 25 so that the liquid is forced to remain for a particular time on the bottoms 6, 7. For as long as the liquid level on the bottom does not reach a particular height no liquid is discharged toward the next section.

The use of a siphon is further advantageous in that a discontinuous flow through the device can be obtained without employing expensive operating mechanisms.

In the device as represented in FIG. 1 it is also possible to shape the outer circumference of the covering hood 13 in all vacuum sections 2, 3 and 4 in such a way that the liguid falling upon the covering hood runs down into a collecting gutter 27 which is provided with an outlet 26 via which the liquid lands in such an area 28 of the lower part of a vacuum section such that a positive flow of the collecting gutter outlet 26 toward the mouth 23 of the recycling line is ensured. In this way it is additionally ensured that all liquid is at least once distributed, via the sprayer, in the vacuum section.

In the embodiment represented in FIG. 3 the concentric partitions 17, viz. an inner guide partition 17b and an outer guide partition 17a, are secured to a supporting partition 21. In order to ensure that the liquid remains for a long time on the bottom, the guide partitions 17 and the supporting partition 21 extend as far as the bottom of the section, so that the liquid supplied via the outlet 26 of the collecting gutter and the standpipe 18 can only reach the outlet, constituted by the standpipe 18', toward a next section after having passed through the openings 29 and 30. The liquid supplied via the outlet 26 of the collecting gutter falls from the area 28 into the space between the wall of the column 1 and the guide partition 17a. The upright wall of the collecting gutter 27 is denoted by 31.

What is claimed is:

1. A device for treating liquids with a gaseous stripping fluid, for deodorizing oils and fats, comprising a column having at least two vertically arranged non-packed sections, each section being provided with a vacuum line connected to a vacuum source, a supply line for stripping fluid opening into each section in the vicinity of the bottom, a liquid supply line for spraying the liquid into the upper part of a section, a discharge line for purified liquid, at least one of said sections being provided with a recycling line having pumping means in said recycling line, said recycling line opening into the upper part of said section into a liquid spraying member, overflow means for passing liquid oil from an upper section to a lower section, the bottom of at least one section being provided with partition means and delivering means for delivering the collected sprayed oil particles at a distance from the opening of the overflow means to prevent passing of oil immediately to the next section through the overflow means.

2. A device according to claim 1, wherein at least one of the sections is provided with a covering member for delivering the liquid spray by the spraying members to the bottom of said section at a distance from the overflow means for the liquid in order not to pass the liquid oil from said section to another section.

* * * * *

UNITED STATES PATENT AND TRADEMARK OFFICE
CERTIFICATE OF CORRECTION

PATENT NO. : 4,009,230
DATED : February 22, 1977
INVENTOR(S) : Johannes Jacobus Smorenburg It is certified that error appears in the above-identified patent and that said Letters Patent are hereby corrected as shown below:

The assignee should read -- STORK AMSTERDAM NV--

Signed and Sealed this twenty-sixth Day of July 1977

[SEAL]

Attest:

RUTH C. MASON
*Attesting Officer*

C. MARSHALL DANN
*Commissioner of Patents and Trademarks*